US006112728A

United States Patent [19]

Schwegler et al.

[11] Patent Number: 6,112,728

[45] Date of Patent: Sep. 5, 2000

[54] DEVICE FOR DIAGNOSIS OF A TANK VENTILATION SYSTEM OF A VEHICLE

[75] Inventors: Helmut Schwegler, Pleidelsheim; Andreas Blumenstock, Ludwigsburg, both of Germany

[73] Assignee: Robert Bosch GmbH, Stuttgart, Germany

[21] Appl. No.: 09/135,364

[22] Filed: Aug. 17, 1998

[30] Foreign Application Priority Data

Aug. 16, 1997 [DE] Germany ........................... 197 35 549

[51] Int. Cl.$^{7}$ .......................... F02M 33/04; G01M 15/00

[52] U.S. Cl. ....................................... 123/520; 123/198 D

[58] Field of Search .................................... 123/520, 516, 123/518, 519, 198 D

[56] References Cited

U.S. PATENT DOCUMENTS

| | | | |
|---|---|---|---|
| 5,297,529 | 3/1994 | Cook et al. . | |
| 5,347,971 | 9/1994 | Kobayashi et al. . | |
| 5,349,935 | 9/1994 | Mezger . | |
| 5,511,529 | 4/1996 | Blumenstock et al. . | |
| 5,767,395 | 6/1998 | Goto et al. | 73/520 |
| 5,829,416 | 11/1998 | Teraoka et al. | 123/520 |
| 5,967,124 | 10/1999 | Cook et al. | 123/520 |

FOREIGN PATENT DOCUMENTS

| | | |
|---|---|---|
| 0688691 A1 | of 0000 | European Pat. Off. . |
| 1 95 02 776 C1 | 6/1996 | Germany . |
| 19502776 | 6/1996 | Germany . |
| WO 94/27131 A1 | 11/1994 | WIPO . |
| WO 97/02421 A1 | 1/1997 | WIPO . |
| WO 97/42407 | 11/1997 | WIPO . |

*Primary Examiner*—Henry C. Yuen
*Assistant Examiner*—Arnold Castro
*Attorney, Agent, or Firm*—Ronald E. Greigg; Edwin E. Greigg

[57] ABSTRACT

A device for diagnosis of a tank ventilation system of a vehicle, including a tank, an adsorption filter that communicates with the tank by way of a tank connection line and has a ventilation line, a tank ventilation valve that communicates with the adsorption filter by way of a valve line, and an on-board pressure source, by means of which the tank ventilation system can be acted upon with a pressure. A shut-off device is provided that only opens when the tank ventilation system is acted on with pressure by means of the on-board pressure source and closes when the tank ventilation system is acted on with pressure by means of a pressure source connected externally for the purpose of functionality testing.

20 Claims, 1 Drawing Sheet

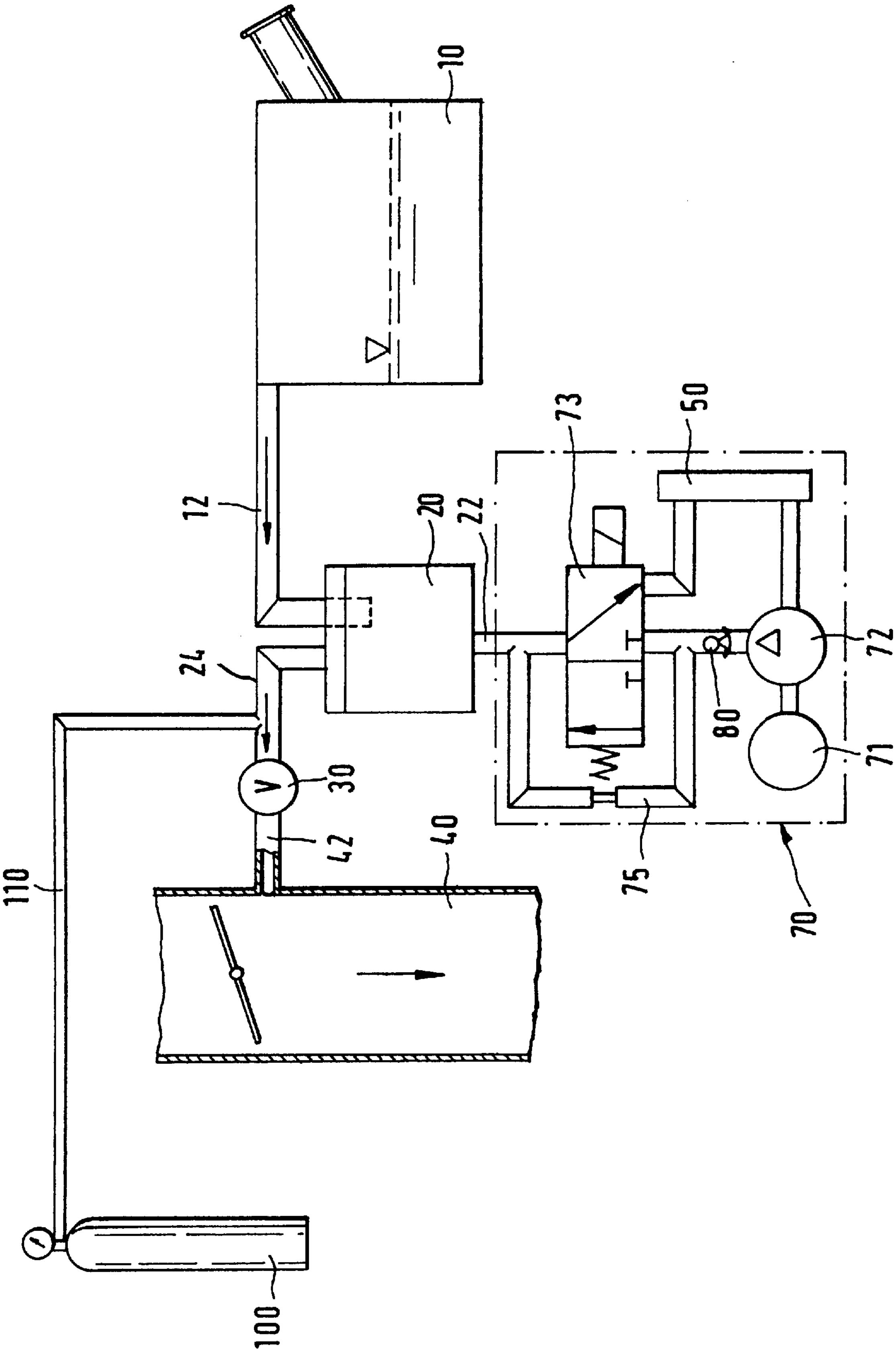
10
12
20
22
24
30
40
42
50
70
71
72
73
75
80
100
110

DEVICE FOR DIAGNOSIS OF A TANK VENTILATION SYSTEM OF A VEHICLE

BACKGROUND OF THE INVENTION

The invention relates to a device for diagnosis a tank ventilation system of a vehicle, including a tank, an adsorption filter that communicates with the tank by way of a tank connection line and has a ventilation line, a tank ventilation valve that communicates with the adsorption filter by way of a valve line, and an on-board pressure source, by means of which the tank ventilation system can be acted upon with a pressure.

The Californian environmental authority (CARB) [California Automotive Repair Bureau] and the American federal environmental authority (Environmental Protection Agency, EPA) require a testing of the functionality of tank ventilation systems in motor vehicles with on-board means (on-board diagnosis, OBDII). In this connection, starting with the model year 2000, leaks of 0.5 mm or greater in size must be detected, signalized, and stored in an on-board memory of the vehicle for later off-board diagnosis.

A process and a device for testing the functionality of a tank ventilation system has been disclosed, for example, by U.S. Pat. No. 5,347,971, in which the tank ventilation system is leak tested by introducing a vacuum into the tank ventilation system and comparing the pressure thus produced with the pressure that is produced by means of a reference leak.

A disadvantage with this process is that the vacuum increases the evaporation of the fuel disposed in the tank.

Therefore DE 195 02 776 C1 has disclosed a device for testing the functionality of a tank ventilation system, in which the testing is carried out by means of an overpressure that is introduced into the tank ventilation system by means of a flow machine. The volume flow introduced is measured by means of a pressure differential measurement at an orifice and then the determination as to whether or not there is a leak is made by means of a comparison with a programmable threshold. With this device, it is problematic that an external shop testing of the tank ventilation system, in which an overpressure is introduced into the tank ventilation system by means of an external pressure source, can only be carried out with difficulty since the tank ventilation system cannot easily be sealed off from the environment and in this respect, a leak can only be detected with difficulty.

A previously unpublished German Patent Application P 196 36 431.0 discloses a process and a device for testing the functionality of a tank ventilation system, which has a tank, an adsorption filter that communicates with the tank by way of a tank connection line and has a ventilation line, a tank ventilation valve that communicates with the adsorption filter by way of a valve line, and an on-board pressure source, by means of which the tank ventilation system can be acted upon with a pressure, in which in order to determine the march of pressure and/or the volume flow supplied, the operating parameters of the pressure source are detected during the introduction of pressure and the existence of a leak is determined from them.

In this device as well, the introduction of an overpressure by means of an external pressure source is problematic since in this device, the adsorption filter cannot be completely sealed off. In a shop test of the tank ventilation system, therefore, air escapes from the tank system and indicates a leak. Consequently one cannot distinguish between a real, actually existing leak and this kind of false leak.

OBJECT AND SUMMARY OF THE INVENTION

An object of the invention, therefore, is to modify a device for diagnosis of a tank ventilation system of a vehicle of this generic type in such a way that in a manner that is as technically simple to realize as possible, a secure sealing of the tank ventilation system in relation to the environment can be achieved whenever a shop test is carried out, i.e. when the tank ventilation system is acted on with an overpressure by means of an off-board pressure source.

ADVANTAGES OF THE INVENTION

This object is attained according to the invention with a device for diagnosis of a tank ventilation system of a vehicle of the type mentioned at the beginning by virtue of the fact that a shut-off device is provided, which only opens when the tank ventilation system is acted on with pressure by means of the on-board pressure source and which closes when the tank ventilation system is acted on with pressure by means of a pressure source connected externally for the purpose of functionality testing.

On the one hand, this shut-off device permits an on-board diagnosis of the tank ventilation system by virtue of the fact that the shut-off valve only opens when the tank ventilation system is acted on with pressure by means of the on-board pressure source and on the other hand, a leak in relation to the environment is prevented when the tank ventilation system is acted on with pressure by means of a pressure source connected externally for the purpose of functionality testing, which is the case, for example, in a shop test of the tank ventilation system.

Particularly in order to assure a long service life of the shut-off device, it is advantageously provided that the shut-off device is disposed so that it is not contained in the flow path of the regenerating air of the adsorption filter.

In this manner, the shut-off device is only flowed through during a tank diagnosis, which is carried out approximately once per driving cycle so that it experiences only a low level of soiling and as a result, has a long service life.

Purely in principle, various potential dispositions of the shut-off device in the tank ventilation system are possible.

One advantageous embodiment provides that the shut-off device is disposed in the flow direction immediately downstream of the pressure source. In particular, this has the great advantage that in addition, all of the components of the tank ventilation system disposed downstream of the shut-off device are detected by an on-board diagnosis.

Another embodiment provides that the shut-off device is disposed in the flow direction immediately upstream of the pressure source. In this instance, the pressure source must be pressure tight to the greatest extent possible in relation to the environment.

The object of the invention is also attained by means of a device for diagnosis of a tank ventilation system of a vehicle, including a tank, an adsorption filter that communicates with the tank by way of a tank connection line and has a ventilation line, a tank ventilation valve that communicates with the adsorption filter by way of a valve line, and an on-board pressure source, by means of which, by way of a switching mechanism, the tank ventilation system and a reference leak connected to it in parallel can be alternatingly acted upon with pressure, in which a shut-off device is provided that opens and is flowed through both when the reference leak is acted on with pressure and when the tank ventilation system is acted on with pressure.

With this device, which permits the diagnosis by means of a reference leak, a through flow of the shut-off device is achieved in a very advantageous manner both during a reference measurement, i.e. when the reference leak is acted on with pressure, and during a so-called tank measurement, i.e. when the tank ventilation system is acted on with pressure.

An extremely wide variety of embodiments are conceivable as regards the structure of the switching mechanism.

The switching mechanism is preferably a 3/2-way valve.

It can furthermore also be provided that the switching mechanism is a 4/2-way valve.

A particularly advantageous embodiment provides that the reference leak is part of the switching mechanism. This embodiment in particular permits a reduction of the components required for carrying out the reference measurement.

In an advantageous manner, it is also provided that the switching mechanism is switched so that the shut-off device is not flowed through during a regeneration procedure of the activated charcoal filter. This achieves the fact that the shut-off device is only flowed through during a tank diagnosis, which is carried out approximately once per driving cycle, which results in a low level of soiling and a long service life of the shut-off device.

Purely in principle, the shut-off device can be embodied in an extremely wide variety of ways. For example, electrically controllable valves are thus conceivable. A particularly advantageous embodiment provides that the shut-off device is a check valve. A mechanical check valve of this kind in particular requires no electrical control and permits a reliable function due to the simple construction.

The invention will be better understood and further objects and advantages thereof will become more apparent from the ensuing detailed description of a preferred embodiment taken in conjunction with the drawing.

BRIEF DESCRIPTION OF THE DRAWINGS

The sole FIGURE schematically represents a device for diagnosis of a tank ventilation system of a vehicle.

DESCRIPTION OF A PREFERRED EMBODIMENT

A device for diagnosis of a tank ventilation system of a vehicle will be described below. It goes without saying that the invention is not limited to the diagnosis of a tank ventilation system of a vehicle, but can also be used in the diagnosis of an arbitrary container.

A tank ventilation system of a motor vehicle, depicted in the sole FIGURE, includes a tank 10, an adsorption filter 20, for example an activated charcoal filter that communicates with the tank 10 by way of a tank connection line 12 and has a ventilation line 22 that communicates with the environment, as well as a tank ventilation valve 30 that on the one hand, communicates with the adsorption filter 20 by way of a valve line 24 and on the other hand, communicates with an intake tube 40 of an internal combustion engine by way of a valve line 42.

Evaporation in the tank 10 produces hydrocarbons that are adsorbed in the adsorption filter 20. To regenerate the adsorption filter 20, the tank ventilation valve 30 is opened so that due to the vacuum prevailing in the intake tube 40, air from the atmosphere is aspirated by means of the adsorption filter 20 by way of a filter 50, by means of which the hydrocarbons adsorbed in the adsorption filter are aspirated into the intake tube 40 and supplied to the internal combustion engine.

To diagnose this tank ventilation system, a diagnosis module 70 is provided, which includes a pressure source in the form of a motor 71 and a compressor 72, by means of which, by way of a controllable switching mechanism 73, for example in the form of a 3/2-way valve that can be controlled, for example, electromagnetically, pressure can be introduced into the tank ventilation system by way of the ventilation line 22 of the adsorption filter 20. Parallel to the switching mechanism 73, i.e. parallel to the 3/2-way valve, a reference leak 75 is disposed, which is acted on with pressure by the compressor 72 when the 3/2-way valve is disposed in a switched position in which the line that leads from the compressor 72 to the adsorption filter 20 is closed (as shown in the sole FIGURE).

A comparison of the measurements in the two switched positions of the switching mechanism 73 permits information to be obtained about a possibly existing leak in the tank ventilation system. In this context, please refer to the previously unpublished German Patent Application P 196 36 431.0, which is referred to in this respect.

As can also be seen in the sole FIGURE, a check valve 80 is disposed directly downstream of the compressor 72 in the pressure line that leads to the 3/2-way valve and to the reference leak 75, upstream of the branching for the reference leak 75, and this check valve opens whenever the tank ventilation system is acted on with a pressure by means of the on-board pressure source, i.e. by the compressor 72 driven by the motor 71. By means of its disposition directly downstream of the compressor 72, the check valve 80 is opened and flowed through both during a reference measurement, i.e. when the reference leak 75 is acted on by a pressure by means of the compressor 72, and during a tank measurement, i.e. when the tank ventilation system is acted on with pressure by means of the compressor 72 when the 3/2-way valve is in the second switched position. As a result of this disposition of the check valve 80, this is therefore taken into consideration both in the tank measurement and in the reference measurement so that no differences whatsoever between the tank measurement and the reference measurement are produced by means of interfering influences caused by the check valve 80.

In a shop measurement, i.e. when an overpressure is introduced into the tank ventilation system by means of an external overpressure source, for example a gas bottle 100 schematically depicted in the sole FIGURE, by way of an additional line 110, which feeds into the valve line 24 leading to the tank ventilation valve 30, the check valve 80 closes and thus seals the entire tank ventilation system off from the environment.

The advantages of the above-described device can be summed up as follows:

A shop test is permitted in a simple manner by virtue of the fact that the check valve closes when the tank ventilation system is acted on by means of an external overpressure source 100 and consequently seals the entire tank ventilation system off from the environment.

The check valve 80 is a mechanical valve so that no additional electrical control is required.

The check valve 80 does not influence the tolerances of the leakage diagnosis since it is switched in the closed position both during a reference measurement, i.e. a measurement in which the reference leak 75 is acted on by a pressure by means of the compressor 72, and during a tank measurement, i.e. when the tank ventilation system is acted on with an overpressure by means of the compressor 72.

The check valve 80 is flowed through by only a small air flow of the overpressure pump (motor 71, compressor 72) and can therefore have a small cross sections.

The check valve 80 is disposed so that it is not flowed through by regenerating air, but is only flowed through during the relatively rare execution of diagnostic procedures that occur approximately once per driving cycle. This results in a low level of soiling and as a result, a long service life of the check valve 80.

The foregoing relates to a preferred exemplary embodiment of the invention, it being understood that other variants and embodiments thereof are possible within the spirit and scope of the invention, the latter being defined by the appended claims.

We claim:

1. A device for diagnosis of a tank ventilation system of a vehicle, comprising a tank (10), an adsorption filter (20) that communicates with the tank (10) by way of a tank connection (12), a ventilation line (22) connected with said adsorption filter, a tank ventilation valve (30) that communicates with the adsorption filter (20) by way of a valve line (24) and with an intake tube via a line (42), an on-board pressure source (71, 72), by means of said on-board pressure source the tank ventilation system is acted upon with an on-board pressure, a shut-off device (80) in a line connected with said on-board pressure source that only opens when the tank ventilation system is acted on with pressure of the on-board pressure source (71, 72) and closes when the tank ventilation system is acted on with pressure by means of a pressure source (100) connected externally for a purpose of functionality testing.

2. The device according to claim 1, in which the shut-off device (80) is disposed in a flow direction immediately upstream of the pressure source (71, 72).

3. The device according to claim 1, in which the shut-off device (80) is a check valve.

4. The device according to claim 1, in which the shut-off device (80) is disposed in a flow direction immediately downstream of the pressure source (71, 72).

5. The device according to claim 1, in which the shut-off device is disposed so that the shut-off device is not contained in the flow path of the regenerating air of the adsorption filter (20).

6. The device according to claim 4, in which the shut-off device (80) is a check valve.

7. The device according to claim 5, in which the shut-off device (80) is a check valve.

8. The device according to claim 5, in which the shut-off device (80) is disposed in a flow direction immediately downstream of the pressure source (71, 72).

9. The device according to claim 5, in which the shut-off device (80) is disposed in a flow direction immediately upstream of the pressure source (71, 72).

10. The device according to claim 8, in which the shut-off device (80) is a check valve.

11. A device for diagnosis of a tank ventilation system of a vehicle, comprising a tank (10), an adsorption filter (20) that communicates with the tank (10) by way of a tank connection line (12), a ventilation line (22) connected with said adsorption filter, a tank ventilation valve (30) that communicates with the adsorption filter (20) by way of a valve line (24) and with an intake tube via a line (42), an on-board pressure source (71, 72), by means of said on-board pressure source, by way of a switching mechanism (73), the tank ventilation system and a reference leak (75) connected in parallel to said switching mechanism can be alternating acted upon with pressure, in which a shut-off device (80) is provided that opens and is flowed through both when the reference leak (75) is acted on with pressure and when the tank ventilation system is acted on with pressure.

12. The device according to claim 11, in which the switching mechanism (75) is switched so that the shut-off device (80) is not flowed through during a regeneration procedure of the activated charcoal filter (20).

13. The device according to claim 11, in which the reference leak (75) is part of the switching mechanism (73).

14. The device according to claim 11, characterized in that the switching mechanism (73) is a 4/2-way valve.

15. The device according to claim 11, in which the switching mechanism (73) is a 3/2-way valve.

16. The device according to claim 13, in which the switching mechanism (75) is switched so that the shut-off device (80) is not flowed through during a regeneration procedure of the activated charcoal filter (20).

17. The device according to claim 14, in which the reference leak (75) is part of the switching mechanism (73).

18. The device according to claim 14, in which the switching mechanism (75) is switched so that the shut-off device (80) is not flowed through during a regeneration procedure of the activated charcoal filter (20).

19. The device according to claim 15, in which the reference leak (75) is part of the switching mechanism (73).

20. The device according to claim 15, in which the switching mechanism (75) is switched so that the shut-off device (80) is not flowed through during a regeneration procedure of the activated charcoal filter (20).

* * * * *